US010628050B2

(12) United States Patent
Luo (10) Patent No.: US 10,628,050 B2
(45) Date of Patent: Apr. 21, 2020

(54) DATA PROCESSING METHOD AND APPARATUS (71) Applicant: Huawei Technologies Co., Ltd., Shenzhen (CN)

(72) Inventor: Xiong Luo, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 15/946,484

(22) Filed: Apr. 5, 2018

(65) Prior Publication Data

US 2018/0225048 A1    Aug. 9, 2018

Related U.S. Application Data (63) Continuation of application No. 15/587,051, filed on May 4, 2017, now Pat. No. 9,952,778, which is a continuation of application No. PCT/CN2014/090299, filed on Nov. 5, 2014.

(51) Int. Cl.
*G06F 3/06* (2006.01)
*H04L 29/08* (2006.01)

(52) U.S. Cl.
CPC .......... *G06F 3/0611* (2013.01); *G06F 3/067* (2013.01); *G06F 3/0644* (2013.01); *G06F 3/0659* (2013.01); *H04L 29/08* (2013.01); *H04L 67/1097* (2013.01)

(58) Field of Classification Search
CPC .... G06F 3/0611; G06F 3/0644; G06F 3/0659; G06F 3/067; H04L 29/08; H04L 67/1097
See application file for complete search history.

(56) References Cited

U.S. PATENT DOCUMENTS

| 6,178,487 | B1 | 1/2001 | Ruff et al. |
| 6,578,039 | B1 | 6/2003 | Kawamura |
| 8,688,718 | B1 | 4/2014 | Dubey et al. |
| 9,047,141 | B2 | 6/2015 | Malewicz et al. |
| 9,952,778 | B2 * | 4/2018 | Luo ................. H04L 67/1097 |
| 2006/0116989 | A1 | 6/2006 | Bellamkonda et al. |
| 2010/0030995 | A1 | 2/2010 | Wang et al. |
| 2010/0135305 | A1 | 6/2010 | Lu et al. |
| 2010/0235606 | A1 * | 9/2010 | Oreland ............ G06F 16/2255 711/173 |
| 2011/0138148 | A1 * | 6/2011 | Friedman .......... G06F 3/0613 711/173 |
| 2011/0258284 | A1 | 10/2011 | Sundstrom |
| 2011/0307447 | A1 | 12/2011 | Sabaa et al. |
| 2012/0158722 | A1 | 6/2012 | Gao et al. |
| 2012/0303791 | A1 | 11/2012 | Calder et al. |
| 2013/0073691 | A1 | 3/2013 | Quan et al. |

(Continued)

FOREIGN PATENT DOCUMENTS

| CN | 102197372 A | 9/2011 |
| CN | 102244685 A | 11/2011 |

(Continued)

*Primary Examiner* — Jerry B Dennison
(74) *Attorney, Agent, or Firm* — Slater Matsil, LLP (57) ABSTRACT A data processing technology is provided, and is applied to a partition management device. The partition management device stores a partition view, the partition view records a correspondence between an ID of a current partition and an address of a storage disk, and a total quantity of current partitions may be less than a total quantity of final partitions.

18 Claims, 5 Drawing Sheets

(56) References Cited

U.S. PATENT DOCUMENTS

| | | |
|---|---|---|
| 2013/0152057 A1 | 6/2013 | Ke et al. |
| 2013/0166556 A1 | 6/2013 | Baeumges et al. |
| 2013/0166606 A1 | 6/2013 | Fricke et al. |
| 2013/0204990 A1* | 8/2013 | Skjolsvold ............ G06F 9/5077 709/223 |
| 2013/0254280 A1 | 9/2013 | Yang et al. |
| 2013/0332446 A1 | 12/2013 | Zhou et al. |
| 2014/0108415 A1 | 4/2014 | Bulkowski et al. |
| 2014/0108474 A1* | 4/2014 | David ................... G06F 3/0611 707/827 |
| 2014/0189128 A1 | 7/2014 | Gu et al. |
| 2014/0351254 A1 | 11/2014 | Fricke et al. |
| 2014/0351636 A1 | 11/2014 | Yin et al. |
| 2015/0019562 A1 | 1/2015 | Bulkowski et al. |
| 2015/0074216 A1 | 3/2015 | Park |
| 2015/0095345 A1 | 4/2015 | Arai |
| 2015/0120750 A1 | 4/2015 | Klefeeda et al. |
| 2015/0163289 A1 | 6/2015 | Paul et al. |
| 2015/0293707 A1* | 10/2015 | Zhang ................. G06F 12/0223 711/5 |
| 2015/0301759 A1 | 10/2015 | Gu et al. |
| 2015/0347585 A1 | 12/2015 | Klotz et al. |
| 2015/0370825 A1 | 12/2015 | Outcalt et al. |
| 2016/0026667 A1 | 1/2016 | Mukherjee et al. |
| 2016/0092493 A1 | 3/2016 | Ko et al. |
| 2016/0110391 A1 | 4/2016 | Korycki et al. |
| 2016/0307646 A1* | 10/2016 | Squires .................. G11C 29/48 |
| 2016/0350394 A1 | 12/2016 | Gaumnitz et al. |
| 2017/0046371 A1 | 2/2017 | Bensberg |
| 2017/0235501 A1* | 8/2017 | Luo ....................... G06F 3/0659 709/201 |
| 2019/0340260 A1* | 11/2019 | Eberlein ............... G06F 3/0644 |

FOREIGN PATENT DOCUMENTS

| | | |
|---|---|---|
| CN | 102567464 A | 7/2012 |
| CN | 102833294 A | 12/2012 |
| CN | 103177061 A | 6/2013 |
| CN | 103503414 A | 1/2014 |
| CN | 103797770 A | 5/2014 |
| CN | 103812934 A | 5/2014 |
| CN | 103929500 A | 7/2014 |
| EP | 2721504 A1 | 4/2014 |
| JP | 2001142751 A | 5/2001 |
| JP | 2012123544 A | 6/2012 |
| JP | 2016507814 A | 3/2016 |

* cited by examiner

DATA PROCESSING METHOD AND APPARATUS

CROSS-REFERENCE TO RELATED APPLICATIONS

This application is a continuation of U.S. patent application Ser. No. 15/587,051, filed on May 4, 2017, which is a continuation of International Application No. PCT/CN2014/090299, filed on Nov. 5, 2014. Both of the aforementioned applications are hereby incorporated by reference in their entireties.

TECHNICAL FIELD

This application relates to data processing technologies, and in particular, to a data processing method and apparatus.

BACKGROUND

As society develops, increasing quantities of data need to be stored and managed, and is even referred to as massive data. When ultra-large-scale data is managed by means of conventional centralized storage, an efficient read/write operation can hardly be provided, and good expandability and high availability can hardly be met.

Against this backdrop, a storage system consisting of a plurality of physical storage nodes emerges, where each storage node can provide storage space. This storage manner is referred to as distributed storage. There is a distributed storage manner that is referred to as key-value storage. In key-value storage, stored data (or a data fragment) is referred to as a value, and each piece of data has a unique identifier in a scope of the entire storage system, and this identifier is a key. A key and a value are in a one-to-one correspondence.

A key and a value corresponding to the key, as a whole, are referred to as a key-value, K-V for short. Each key-value is stored on a storage disk of the storage system. In a distributed hash table (DHT) technology, for a specific key-value, a storage disk on which the key-value is stored may be determined using a mapping rule. This mapping rule is based on a hash value that is generated by performing a hash operation on a key, where each hash value belongs to one partition, and a partition corresponds to a storage disk, so that each key-value corresponds to one storage disk. Based on this method, if calculated hash values of two different keys are the same, key-values corresponding to the two keys are stored on a same storage disk. A correspondence between a partition and a storage disk is referred to as a partition view.

In the prior art, a Hash value calculated according to a key using the DHT technology falls, for example, within an integer range of $[0, 2^{32}-1]$. During system initialization, segmentation is performed on this large integer range, where each segment is equal or approximately equal in size. In this case, one segment is a partition, and quantities of hash values in the partitions are basically the same. When a quantity of storage disks in a storage disk cluster is relatively small, each storage disk has excessive partitions, causing that a partition view is excessively complex, so that data packet forwarding according to the partition view is inefficient. Specific examples are as follows.

It is assumed that there is a cluster that supports a maximum of 25,000 storage disks. In a case of a maximum quantity of storage disks, each storage disk has approximately 100 partitions. That is, the entire cluster has 2,500,000 partitions in total. It is assumed that information in each partition occupies a storage space of four bits. Information in these partitions occupies a storage space of 10 MB in total, and information in a partition view is greater than 10 MB.

When a partition view is used, a large quantity of system resources are occupied.

SUMMARY

The present invention provides a data processing method and apparatus, which can reduce occupation of system resources when key-value data is processed.

According to a first aspect, the present invention provides a data processing method, which is applied to a partition management device. The partition management device stores a partition view, and the partition view records a correspondence between an ID of a current partition and an address of a storage disk. The method includes: obtaining a key in key-value data, and calculating, according to the key, an ID of a final partition that corresponds to the key-value data. The key-value data includes a value and the key uniquely corresponding to the value. The method also includes calculating an ID of a current partition that corresponds to the ID of the final partition, where an ID of each current partition is corresponding to IDs of a plurality of final partitions. The method also includes searching the partition view to obtain an address of a storage disk that corresponds to the ID of the current partition. The method also includes generating a key-value packet by using the address of the storage disk as a destination address, and sending the key-value packet to the storage disk, where the key-value packet carries the key-value data.

According to a second aspect, the present invention provides a data processing apparatus. The apparatus includes a storage module, configured to store a partition view, where the partition view records a correspondence between an ID of a current partition and an address of a storage disk. The apparatus also includes a final-partition calculating module, configured to: obtain a key in key-value data; and calculate, according to the key, an ID of a final partition that is corresponding to the key-value data, where the key-value data includes a value and the key uniquely corresponding to the value. The apparatus also includes a current-partition calculating module, configured to calculate an ID of a current partition that is corresponding to the ID of the final partition, where an ID of each current partition is corresponding to IDs of a plurality of final partitions. The apparatus also includes a searching module, configured to search the partition view stored by the storage module, to obtain an address of a storage disk that is corresponding to the ID of the current partition. The apparatus also includes a sending module, configured to: generate a key-value packet by using the address of the storage disk as a destination address; and send the key-value packet to the storage disk, where the key-value packet carries the key-value data.

According to a third aspect, the present invention provides a data processing device. The data processing device includes: a memory, configured to store a partition view, where the partition view records a correspondence between an ID of a current partition and an address of a storage disk. The data processing device also includes an interface, configured to provide an external interface. The data processing device also includes a computer-readable medium, configured to store a computer program. The data processing device also includes a processor, connected to the memory, the interface, and the computer-readable medium. The processor is configured to execute the following steps by running the program: obtaining a key in key-value data, and calculating, according to the key, an ID of a final partition that is corresponding to the key-value data, where the key-value data includes a value and the key uniquely corresponding to the value; calculating an ID of a current partition that is corresponding to the ID of the final partition, where an ID of each current partition is corresponding to IDs of a plurality of final partitions; searching the partition view to obtain an address of a storage disk that is corresponding to the ID of the current partition; and generating a key-value packet by using the address of the storage disk as a destination address, and sending the key-value packet to the storage disk through the interface, where the key-value packet carries the key-value data.

According to a fourth aspect, the present invention provides a partition management method, which is executed by a controller. The controller performs partition management on a storage disk in a cluster. The cluster includes a plurality of storage disks. The method includes: acquiring a quantity M of current storage disks in the cluster and a total quantity T of currently existing partitions in the cluster when it is detected that N new storage disks are to join the cluster, where M, N, and T are all natural numbers. The method also includes determining whether a mathematical relationship between the total quantity T of current partitions and a total quantity M+N of storage disks meets a first preset condition. If the relationship meets the first preset condition, the method also includes splitting at least one of the current partitions, so that a total quantity of partitions obtained after the splitting is S. The method also includes allocating the partitions obtained after the splitting to the M+N storage disks, where a mathematical relationship between the total quantity S of partitions obtained after the splitting and the total quantity M+N of storage disks meets a second preset condition, the total quantity of partitions obtained after the splitting is not greater than a total quantity L of final partitions supported by the cluster, and both L and S are natural numbers greater than 1.

In a first implementation manner of the fourth aspect, an operation of updating a partition view is further executed, where the partition view records a correspondence between a current partition and an IP disk.

According to a fifth aspect, the present invention provides a partition management apparatus, configured to perform partition management on a storage disk in a cluster. The cluster includes a plurality of storage disks. The apparatus includes: a storage disk detection module, configured to: when detecting that N new storage disks are to join the cluster, acquire a quantity M of current storage disks in the cluster and a total quantity T of currently existing partitions in the cluster, where M, N, and T are all natural numbers. The apparatus also includes a first-preset-condition determining module, configured to determine whether a mathematical relationship between the total quantity T of current partitions and a total quantity M+N of storage disks meets a first preset condition. The apparatus also includes a partition splitting module, configured to: if the relationship meets the first preset condition, split at least one of the current partitions, so that a total quantity of partitions obtained after the splitting is S; and allocate the partitions obtained after the splitting to the M+N storage disks, where a mathematical relationship between the total quantity S of partitions obtained after the splitting and the total quantity M+N of storage disks meets a second preset condition, the total quantity of partitions obtained after the splitting is not greater than a total quantity L of final partitions supported by the cluster, and both L and S are natural numbers greater than 1.

In a first implementation manner of the fifth aspect, the partition splitting module is further configured to execute an operation of updating a partition view, where the partition view records a correspondence between a current partition and an IP disk.

According to a sixth aspect, the present invention provides a partition management device. The partition management device is connected to a cluster and is configured to perform partition management on a storage disk in the cluster, where the cluster includes a plurality of storage disks. The partition management device includes: a memory, configured to store a partition view, where the partition view records a correspondence between an ID of a current partition and an address of a storage disk. The partition management device also includes: an interface, configured to provide an external interface. The partition management device also includes: a computer-readable medium, configured to store a computer program. The partition management device also includes: a processor, connected to the memory, the interface, and the computer-readable medium. The processor is configured to execute the following steps by running the program: acquiring a quantity M of current storage disks in the cluster and a total quantity T of currently existing partitions in the cluster when it is detected, by using the interface, that N new storage disks are to join the cluster, where M, N, and T are all natural numbers; determining whether a mathematical relationship between the total quantity T of current partitions and a total quantity M+N of storage disks meets a first preset condition; and if the relationship meets the first preset condition, splitting at least one of the current partitions, so that a total quantity of partitions obtained after the splitting is S; and allocating the partitions obtained after the splitting to the M+N storage disks, where a mathematical relationship between the total quantity S of partitions obtained after the splitting and the total quantity M+N of storage disks meets a second preset condition, the total quantity of partitions obtained after the splitting is not greater than a total quantity L of final partitions supported by the cluster, and both L and S are natural numbers greater than 1.

In a first implementation manner of the sixth aspect, the processor further executes an operation of updating a partition view, where the partition view records a correspondence between a current partition and an IP disk.

By using the solutions of the present invention, a partition management device may use a current partition to perform key-value data forwarding. Because a quantity of current partitions is less than that of final partitions, resource consumption is reduced compared with a solution in the prior art in which a final partition is used to perform forwarding.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some rather than all of the embodiments of the present invention. All other embodiments obtained based on the embodiments of the present invention shall fall within the protection scope of the present invention.

Figure 1:
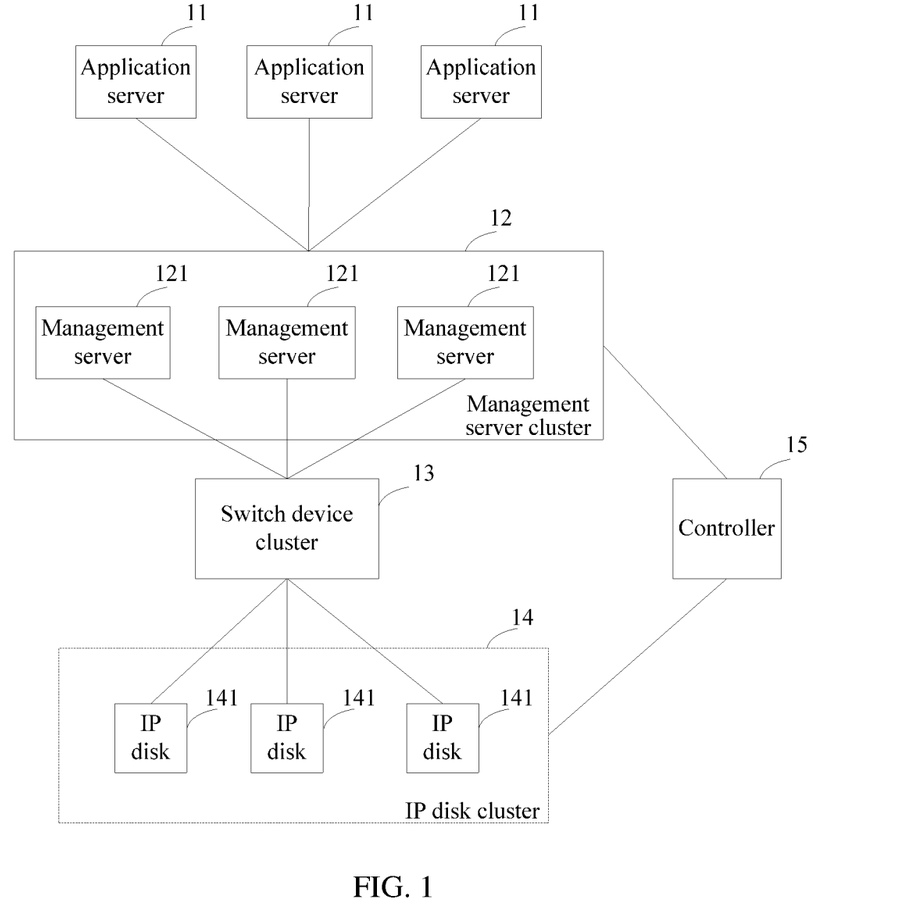
FIG. 1 is a topology diagram of an embodiment of a storage system according to the present invention.

As shown in FIG. 1, FIG. 1 is a topology diagram of a storage system according to an embodiment of the present invention. An application server 11 is connected to a management server cluster 12. The management server cluster 12 is connected to a switch cluster 13. The switch cluster 13 is connected to an IP disk cluster 14. A controller 15 is connected to the management server cluster 12 and the IP disk cluster 14. The management server cluster 12 consists of at least one management server 121. The IP disk cluster 14 consists of at least one IP disk 141.

The application server 11 sends a data read command or a data write command. The management server 121 is, for example, a distributed object pool (DOP), and provides an interface of an object to the application server 11, where the object may be very large, for example, in a basic unit of GB.

If an object is excessively large, the management server 121 may split the object into small segments. For example, the management server 121 may split the object into segments with a size of 1 MB each, where each segment is a value, and each value has a tag called a key. The management server 121 may perform a hash operation on the key, and match a calculated hash value with a partition. In addition, the management server 121 may further store a partition view, where the partition view records a correspondence between an IP disk and a partition, which may be specifically a correspondence between an ID of a current partition and an IP disk. Therefore, the management server 121 may find an IP disk corresponding to each key-value. The found IP disk is referred to as a target disk, and the management server 121 may generate an IP packet using an address of the target IP disk as a destination address, and send the IP packet to the switch cluster 13. For example, content recorded in the partition view is shown in Table 1, where i is a natural number, and m is a natural number greater than 1.

TABLE 1

| Address of IP disk | Partition number | | | |
|---|---|---|---|---|
| IP disk 0 | Partition 0 | Partition 1 | ... | Partition i − 1 |
| IP disk 1 | Partition i | Partition i + 1 | ... | Partition 2i − 1 |
| ... | ... | ... | ... | ... |
| IP disk m − 1 | Partition i · (m − 1) | Partition i · (m − 1) + 1 | ... | Partition i · m − 1 |

The switch cluster 13 consists of at least one switch, and is used to exchange data between the management server 121 and the IP disk 141 during data read or data write. An operation of searching the partition view may also be handed over to and executed by a switch in the switch cluster 13; that is, the switch in the switch cluster 13 stores the partition view. In this scenario, when sending data to the switch cluster 13, the management server 121 may not use an IP packet, but use a new type of packet that may be referred to as a key-value packet. Differences between the key-value packet and the IP packet lie only in that: a destination address of the key-value packet is a partition number obtained through calculation by using the key, and a packet type field is used to differentiate the IP packet from the key-value packet. Other parts of the key-value packet are the same as those of the IP packet. The switch searches a mapping table between a partition number and an address of an IP disk, where the mapping table is stored by the switch, replaces a destination address with an address of an IP disk corresponding to a partition, and modifies a packet type, to convert a key-value packet into an IP packet, and then forwards the IP packet to a corresponding IP disk for storage.

In the management server 121, a manner of recording a correspondence between a partition and an IP disk may be recording a correspondence between a partition number (also referred to as a partition ID) and an address of an IP disk. For ease of understanding, another expression manner of the correspondence is that the partition belongs to the IP disk. Still another expression manner is that: the IP disk owns the partition.

A partition is a logical concept, and the partition does not own storage space; it is an IP disk that stores data actually. However, each partition has a corresponding IP disk. During a data storage process, an IP disk corresponding to a partition can be learned by searching a partition view, to perform real storage. From a perspective of a user, data seems to be stored in the partition; therefore, sometimes we also refer to a process of storing data in an IP disk corresponding to a partition as storing data in a partition.

The controller 15 is configured to calculate a total quantity of partitions, acquire information about an IP disk, establish a correspondence between an IP disk and a partition, and update the correspondence into each management server in a timely manner. The correspondence is also referred to as a partition view.

In the prior art, because a total quantity of partitions is constant, as a quantity of IP disks increases, partitions corresponding to each IP disk decrease. Therefore, when the quantity of IP disks is relatively small, each IP disk is corresponding to excessive partitions. For example, in the example in Background, if there are 25,000 storage disks, it is proper for each storage disk to have 100 partitions. However, in a case in which there are 75 storage disks, each storage disk has 33,333 partitions, which is improper, because this may cause at least the following problems.

(1) A partition view is excessively complex, because the partition view has 75×33,333=2,499,975 correspondences, which approximates a quantity of correspondences in the case in which there are 25,000 storage disks. When forwarding an IP packet using the partition view, the management server needs to retrieve a correspondence in the partition view. Such a large quantity of correspondences need to be retrieved when a quantity of IP disks is small, resulting in low forwarding efficiency. In addition, when the partition view is published, the controller needs to publish the partition view to each management server, which occupies relatively large bandwidth. Therefore, excessive processing resources of a management server and excessive bandwidth resources of a storage system are occupied.

(2) To improve data reliability, each partition has a duplicate partition on another IP disk, where the partition and its duplicate partition locate in different IP disks, but store same data. This case is referred to as a plurality of duplicates. It is assumed that partition B and partition C are duplicate partitions of partition A. When a packet is stored on an IP disk on which partition A is located, the packet is stored, at the same time, on an IP disk on which partition B is located and on an IP disk on which partition C is located.

In a scenario of a plurality of duplicates, it is assumed that a fault occurs on an IP disk. Data in the faulty storage disk needs to be recovered using a duplicate, to ensure data reliability. Specifically, the faulty IP disk is searched for duplicate partitions of partitions, data in the duplicate partitions is copied, and the copied data is stored on an IP disk with no fault. When there are excessive partitions in each IP disk, quantities of duplicate partitions of these partitions are also very large, and these duplicate partitions may be located in a large quantity of other IP disks. As a result, when one IP disk is faulty, the large quantity of other IP disks are also involved in data recovery, and during the data recovery, performance of all these IP disks involved in the data recovery is affected.

(3) In the scenario of a plurality of duplicates, if each IP disk has an excessive quantity of partitions, for one IP disk, duplicates of a partition of the IP disk are scattered in a large quantity of IP disks. Because a quantity of IP disks storing the duplicates is relatively large, a probability that a fault occurs in a plurality of IP disks at the same time increases, thereby lowering data reliability.

(4) This embodiment of the present invention introduces in concepts of a parent partition and a final partition, where a total quantity of final partitions is constant, which is similar to partitioning in the prior art. The parent partition may be split into a plurality of sub-partitions, and if a sub-partition may be split into new sub-partitions, the sub-partition is a parent partition of a next-level sub-partition. As a quantity of IP disks in a cluster increases, the splitting process may proceed, until final partitions are obtained through splitting. In this case, a quantity of partitions owned by the entire cluster reaches the total quantity of final partitions.

It should be noted that, in the prior art, a quantity of partitions seen by a user and a quantity of partitions managed inside a storage system are the same. No matter how many IP disks a cluster owns, a quantity of partitions is constant; while in this embodiment of the present invention, what a user sees is still a quantity of final partitions. However, before a parent partition is split into final partitions, a storage system is managed by using the parent partition. That is, both a partition view and packet forwarding are processed by using the parent partition. In the embodiments of the present invention, unless otherwise noted, a partition refers to a partition managed by the storage system.

When there is a relatively small quantity of IP disks in a cluster, a proper quantity of parent partitions are allocated to each IP disk, and a quantity of merged partitions of each IP disk may be specified by an administrator or be automatically set by the system, and is not limited by a quantity of final partitions. For example, when the cluster owns 75 IP disks, each IP disk corresponds to 100 parent partitions, and only 75×100=7,500 correspondences exist in the partition view. When the cluster owns 150 IP disks, and each parent partition is split into 2 sub-partitions, each IP disk still corresponds to 100 partitions. It is assumed that each partition owns one duplicate, and then a quantity of other IP disks that are affected will be limited within 100 when a fault occurs on an IP disk. That is, the present invention may implement customization of a quantity of partitions, so that a quantity of partitions owned by each IP disk is controllable. Based on the method provided in this embodiment of the present invention, when the controller sends a partition view to each management server in the management server cluster, smaller bandwidth is occupied. In addition, after a quantity of entries of correspondences decreases, the management server is faster in querying an address of a storage disk corresponding to a key.

When the application server 11 needs to read data or write data, the data passes through the management server 121 and the switch cluster 13 in sequence and reaches an IP disk.

The IP disk may use a magnetic disk or a flash memory as a storage medium, provide a key-value interface in software, provide an Ethernet interface in hardware, and decompress an Ethernet frame received through the Ethernet interface to obtain an IP packet. The IP disk is, for example, a Kinetic product of Seagate Technology.

In this embodiment of the present invention, memories for storing key-value data are collectively referred to as a storage disk. In addition to the IP disk, in another implementation manner, the storage disk may also use another storage device supporting the key-value interface, and use a non-Ethernet interface in hardware. A storage medium used by the storage disk may be a hard disk or a flash memory.

Figure 2:
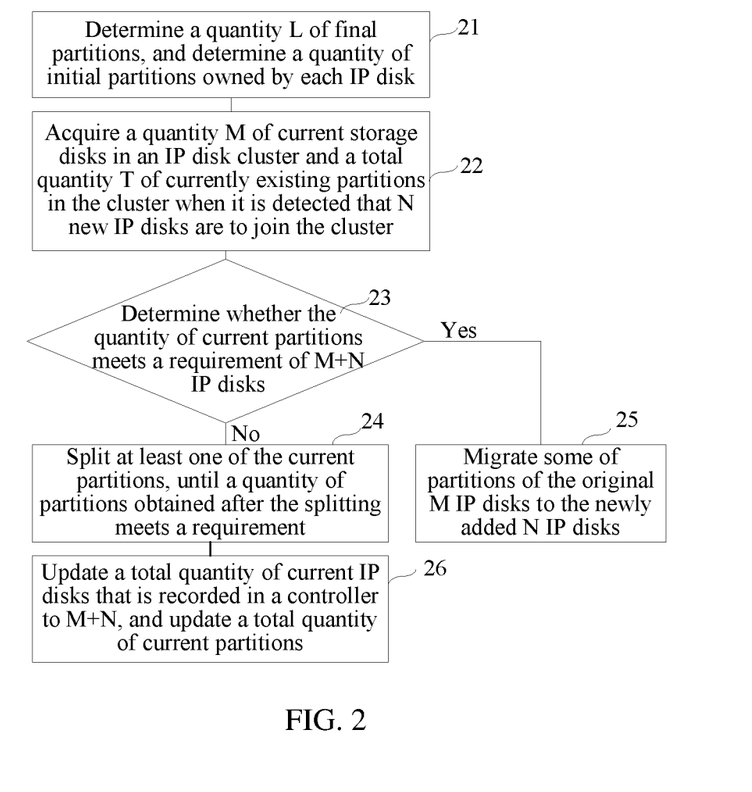
FIG. 2 is a flowchart of an embodiment of a partition management method according to the present invention.

FIG. 2 introduces a partition management method according to an embodiment of the present invention, and describes how to increase a quantity of partitions to meet a requirement of newly added IP disks when a quantity of IP disks in an IP disk cluster expands. This method is executed by a controller, and the method includes the following steps.

Step 21: Determine a quantity L of final partitions according to a maximum quantity of IP disks supported by a cluster, where L is a natural number; and determine, according to a quantity of initial IP disks, a quantity of initial partitions owned by each IP disk. This step is a prepositive step executed when the controller is initialized, and is optional. In addition, each initial partition is corresponding to one storage disk, and this correspondence is recorded by using a partition view.

After this step is executed, the controller records the quantity of initial IP disks as a quantity M of current IP disks, and records the quantity of initial partitions owned by each IP disk as a quantity P of current partitions, where a total quantity T of currently existing partitions in the cluster is: T=M·P. The controller further records a quantity L of final partitions. Subsequently, if the quantity of IP disks in the cluster changes or the quantity of partitions of each IP disk changes, the quantity M of current IP disks and the quantity P of current partitions are updated. In the embodiments of the present invention, the symbol "·" represents a product.

The quantity of final partitions is constant, and a final partition cannot be split and can be perceived by a user. An initial partition is generally a parent partition, and the parent partition is a partition that may be split, to generate next-level parent partitions or final partitions through splitting. The parent partition is used by a storage system, and the user cannot perceive existence of the parent partition. In this embodiment of the present invention, a current partition refers to a partition used by a management server at a current moment, and is published by the controller to the management server. If splitting of a partition is executed, the current partition is a partition obtained after partition splitting. The current partition may be a parent partition or may include a final partition.

A value of L may be set by the user or may be automatically allocated by a system, which is generally determined by both the maximum quantity of IP disks and a quantity of partitions of each IP disk when the quantity of IP disks is maximum, that is, L=Maximum quantity of IP disks×Quantity of partitions of each IP disk. It is assumed that it is a preferable value for each IP disk to own X partitions. For example, a user considers that it is a relatively proper value for each IP disk to own 100 partitions, that is, X=100, and a maximum quantity of IP disks that can be supported by an IP disk cluster is 10,000; then, L=10,000×100=1,000,000.

Similarly, the quantity of initial partitions may be set by the user or may be automatically allocated by the system. One optional manner is that: it is assumed that in an initial situation, a quantity M of IP disks is: M=75, and 100 partitions are allocated to each IP disk. Then, the total quantity of initial partitions=75×100=7,500. By using the method of the present invention, in an initial phase, a quantity of partitions owned by each IP disk in the storage system may be set freely, where the quantity of partitions may be set to a value that meets a demand of the user and with which the partitions do not occupy excessive resources such as storage resources, calculation resources, and bandwidth resources.

Each initial partition corresponds to a final partition. Each initial partition has an ID, and a number of the ID is an integer greater than or equal to 0. Each final partition has an ID, and a number is an integer greater than or equal to 0. A method for obtaining a final partition corresponding to an initial partition is: performing a modulo operation on a total quantity of initial partitions by using an ID of the final partition, where a value of a remainder indicates an ID of the initial partition corresponding to the final partition. In this case, the initial partition is a current partition.

Step 22: Acquire a quantity M of current storage disks in the cluster and a total quantity T of currently existing partitions in the cluster when it is detected that N new IP disks are to join the IP disk cluster, where M, N, and T are all natural numbers.

The controller is connected to the IP disk cluster. Therefore, a new IP disk to join the cluster can be detected by the controller. Currently, there are already M IP disks, and a total quantity of current partitions is M·P. The N IP disks have been connected to the cluster physically, and can be detected by the controller, but cannot store data because no partition is allocated to the IP disks.

It should be noted that, "current" refers to a moment at which this step is to be executed. In this embodiment, an IP disk is not added after the controller is initialized. Therefore, the quantity of current IP disks is M. In another embodiment, if the quantity of IP disks in the IP disk cluster changes before this step is executed, a quantity of current IP disks is not M. If a partition has been split before this step is executed, a quantity of initial partitions currently owned by each IP disk is larger than P. T partitions are roughly evenly allocated to M IP disks.

Step 23: Determine whether the quantity of current partitions meets a common requirement of the current IP disks and the newly added IP disks, that is, determine whether a mathematical relationship between the total quantity T of current partitions and a total quantity M+N of storage disks meets a first preset condition. Specifically, the determining may be performed in a manner of comparing a formula M·P/(M+N) and a first threshold, where the first threshold is a natural number, and the first threshold may be preset by the controller. When this step is executed for the first time after the controller is initialized, T=M·P. Optionally, the foregoing first threshold may be an integer greater than 10 and less than 20, such as 16, 17, 18, or 19.

One determining method is that: if T/(M+N) is less than the first threshold, the first preset condition is met, and splitting needs to be performed. If a quantity of partitions owned by each IP disk is less than (or may be set to be less than or equal to) a splitting threshold, a quantity of partitions owned by each IP disk is excessively small if splitting is not performed. Therefore, it is necessary to increase a total quantity of partitions through splitting; then, step 24 is executed. If the quantity of partitions owned by each IP disk is not less than the splitting threshold, step 25 is executed.

Another determining method is that, if an average quantity of partitions owned by each IP disk is greater than (or may be set to be greater than or equal to) a threshold after one time of partition splitting, it indicates that a quantity of partitions owned by each IP disk is excessively large if splitting is performed. Then, step 25 is executed. If the average quantity of partitions owned by each IP disk is not greater than the threshold, step 24 is executed. In addition, the two determining methods may also be combined to perform determining, and a solution with a highest satisfaction degree to a service is selected. All of the following embodiments describe the present invention by using the first determining method as an example.

Step 24: Split at least one of the current partitions, which may be splitting once, or be splitting for a plurality of times, until a quantity of partitions obtained after the splitting meets a requirement. Then, execute step 26. That a quantity of partitions obtained after the splitting meets a requirement may be that: a mathematical relationship between a total quantity S of partitions obtained after the splitting and the total quantity M+N of storage disks meets a second preset condition, where the total quantity of partitions obtained after the splitting is not greater than the total quantity L of final partitions. Splitting for a plurality of times refers to performing a plurality of times of splitting on partitions generated through splitting.

That a mathematical relationship between a total quantity S of partitions obtained after the splitting and the total quantity M+N of storage disks meets a second preset condition may be specifically that: S/(M+N) is greater than or equal to a second threshold, where the second threshold is a natural number. The second threshold may be, for example, a natural number greater than 25 and less than 50, such as 25, 26, 27, 48, or 49.

There may be various manners for determining whether the quantity of partitions obtained after the splitting meets a requirement. For example, if the mathematical relationship between the total quantity S of partitions obtained after the splitting and the total quantity M+N of storage disks meets the second preset condition, splitting ends. Specifically, for example, if an average quantity of partitions owned by each IP disk after splitting is greater than or equal to the second threshold, it is considered that the second preset condition is met, and splitting ends. Alternatively, if an average quantity of partitions owned by each IP disk after splitting meets a preset threshold scope, it is considered that the requirement is met.

If each partition is split into a plurality of sub-partitions in each time of splitting, each partition is split into a same quantity of sub-partitions. From the first time of splitting to an end of splitting, a multiple by which a quantity of partitions changes is referred to as a splitting coefficient. It is assumed that each parent partition is split into two sub-partitions in each time of splitting. Then, if splitting ends after one time of splitting, a splitting coefficient is 2; if splitting ends after two times of splitting, a splitting coefficient is $2^2$.

If splitting at least one of the current partitions refers to splitting all of the current partitions, a total quantity S of partitions obtained after the splitting=T×Splitting coefficient. If splitting at least one of the current partitions refers to splitting some of the current partitions, a total quantity S of partitions obtained after the splitting<T×Splitting coefficient. A splitting speed in the former splitting manner is higher. In the latter splitting manner, adjustability of the total quantity of partitions obtained after the splitting is better. For convenience of description, this embodiment of the present invention is described by using the latter splitting manner.

The following gives an example of the latter splitting method: it is assumed that the total quantity of final partitions is 1,000, the total quantity of current partitions is 512, and the splitting coefficient is 2. If each partition is split, 1,024 partitions are obtained after splitting, which exceeds the total quantity of final partitions. That the total quantity of current partitions is greater than the total quantity of final partitions is not allowed. To avoid this case, only 488 current partitions may be split: 488+512=1,000, that is, a total quantity of current partitions obtained after splitting just reaches 1,000 and is not greater than the total quantity of final partitions. In addition, if a user considers that 1,000 current partitions are an excessively large quantity, for example, the user considers that it is most proper that the total quantity of current partitions obtained after splitting reaches 800, 288 partitions of the 512 current partitions may be split according to the splitting coefficient 2, so that the total quantity of current partitions obtained after splitting just reaches 800. By using the latter splitting method, it may be that only one partition is split each time. If the splitting coefficient is 2, a difference of total quantities of current partitions before and after splitting is 1; therefore, a granularity for splitting a partition is smallest.

In addition, on the basis of the foregoing embodiment, a splitting coefficient may also be changed. For example, during splitting for the first time, 2 is used as a splitting coefficient, but during splitting for the second time, a splitting coefficient is changed to 5. This can also achieve an objective of rendering a value of the total quantity of partitions obtained after the splitting more adjustable.

There is a correspondence between a current partition and a final partition. This correspondence may be stored in the controller, and may be published by the controller to each management server. Each current partition has an ID, and an ID of a current partition may be an integer greater than or equal to 0. There are T current partitions in total, and IDs of the T current partitions form an arithmetic progression in which a first term is 0, a common difference is 1, and a quantity of terms is T. Each final partition has an ID, and an ID of a final partition may be an integer greater than or equal to 0. There are S final partitions in total, and IDs of the S final partitions form an arithmetic progression in which a first term is 0, a difference is 1, and a quantity of terms is S. For example, 12 partitions are split into 24 partitions, where IDs of the partitions before splitting are 0, 1, 2, 3, . . . , 9, 10, and 11, and IDs of the partitions after splitting are 0, 1, 2, 3, . . . , 21, 22, and 23.

After a partition is split, a partition ID generation rule may be that: in partitions obtained after the splitting, one partition retains an original ID of the partition, and values of IDs of the other partitions and a value of the original ID of the partition form an arithmetic progression, where terms in the progression increase progressively by a common difference of a total quantity M of partitions before splitting. For example, there are 200 partitions in total before splitting, and after splitting, each partition is split into 3 partitions. IDs of three partitions generated after splitting of a partition whose ID is 21 are 221, 421, and 621 in sequence. This ID generation rule may be changed, provided that IDs of current partitions still form a progressively increasing arithmetic progression in which a first term is 0 and a common difference is 1 after an entire splitting process ends.

For example, according to another partition ID generation rule: IDs of three partitions obtained by splitting a partition whose ID is 0 may further be 0, 201, and 202; IDs of partitions obtained by splitting a partition whose ID is 1 are 1, 203, and 204; IDs of partitions obtained by splitting a partition whose ID is 3 are 3, 205, and 206; IDs of other partitions can be obtained by analogy.

It should be noted that, when a total quantity T of current partitions is about to reach the total quantity L of final partitions, a case like this may occur: if a total quantity of partitions generated by splitting each partition once is greater than the total quantity L of final partitions, it may be that only some of the partitions are split, or a splitting coefficient is decreased, so that a total quantity of partitions may be increased through splitting, and the total quantity of partitions does not exceed the total quantity L of final partitions.

Step 25: Perform partition migration, to migrate some partitions owned by the original M IP disks to the newly added N IP disks, so that M·P partitions are evenly distributed on the M+N IP disks. After step 25 is executed, the total quantity of partitions in the entire system is unchanged, and an average quantity of partitions owned by each IP disk decreases. Step 24 and step 25 is executed alternatively. In a complete embodiment of the partition management method, after step 24 is executed, step 25 or step 26 is not executed.

Step 26: Update a total quantity of current IP disks that is recorded in the controller to M+N, and update a total quantity of current partitions to S. This step may also be executed at the same time as step 24. A quantity of current partitions of each IP disk is roughly S/(M+N); therefore, the total quantity S of partitions may not be recorded; instead, it is recorded that the quantity of current partitions of each IP disk in the cluster is roughly S/(M+N).

Step 26 is preparation for a next time of splitting. Therefore, for the current partition management operation, step 26 is not a mandatory step.

It should be noted that, the S current partitions are allocated to M+N IP disks. An operation of updating a partition view may be further executed, where the partition view records IP disks corresponding to the current partitions, which may be specifically a correspondence between an ID of a current partition and an address of an IP disk. The operation of updating the partition view may be executed in step 24 or step 26. The following data processing method may use the partition view updated in this step. Actually, because a partition can be used only after the correspondence between the current partition and the IP disk is correctly recorded, in another embodiment of the present invention, when a change to the current partition is involved, the operation of updating the partition view needs to be executed.

Figure 3:
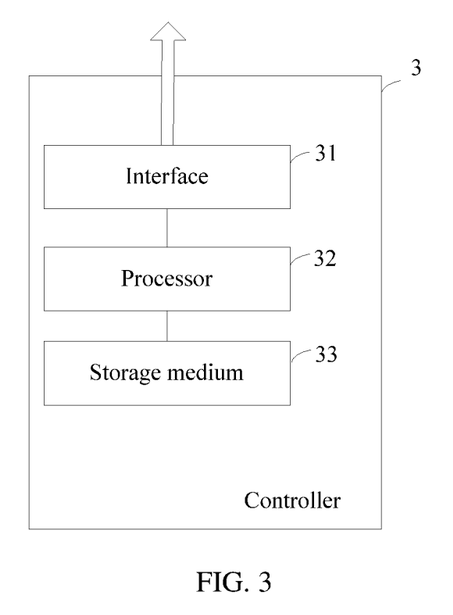
FIG. 3 is a structural diagram of an embodiment of a controller according to the present invention.

The foregoing partition management method may be executed by using hardware shown in FIG. 3. In FIG. 3, a controller 3 includes an interface 31, a processor 32, and a storage medium 33.

The interface 31 is configured to provide an external interface, for example, to connect a storage disk cluster and a management server. The storage medium 33 is configured to store computer program code. The processor 32 executes the foregoing partition management method by running the program code in the storage medium 33.

Figure 4:
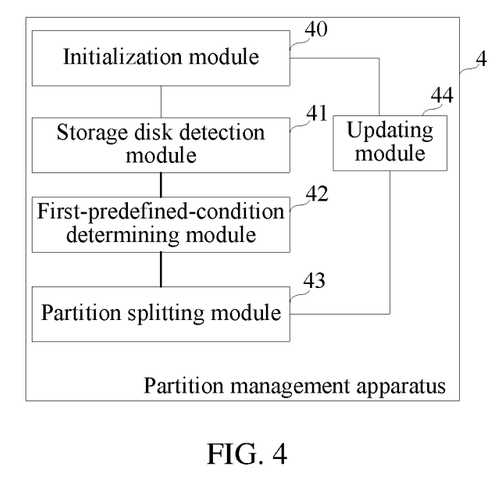
FIG. 4 is a schematic diagram of an embodiment of a partition management apparatus according to the present invention.

Referring to FIG. 4, an embodiment of the present invention further provides a partition management apparatus 4, where the partition management apparatus 4 may be hardware, or virtual hardware formed by software. The partition management apparatus 4 may execute the foregoing partition management method. The partition management apparatus 4 includes a storage disk detection module 41, a first-preset-condition determining module 42, and a partition splitting module 43. Optionally, the partition management apparatus 4 may further include an initialization module 40. Optionally, the partition management apparatus 4 may further include an updating module 44.

The initialization module 40 is configured to: determine a quantity L of final partitions according to a maximum quantity of IP disks in a cluster, where L is a natural number; and determine, according to a quantity of initial IP disks, a quantity of initial partitions owned by each IP disk. This step is a prepositive step executed only when the controller is initialized, and therefore, is optional.

The updating module 44 may record the quantity of initial IP disks as a quantity M of current IP disks, and record the quantity of initial partitions owned by each IP disk as a quantity P of current partitions, where a total quantity T of currently existing partitions in the cluster is: T=M·P. The updating module 44 further records the quantity L of final partitions. Subsequently, if the quantity of IP disks in the cluster changes or the quantity of partitions of each IP disk changes, the quantity M of current IP disks and the quantity P of current partitions are updated. In the embodiments of the present invention, the symbol "·" represents a product.

The quantity of final partitions is constant, and a final partition cannot be split and can be perceived by a user. An initial partition is generally a parent partition, and the parent partition is a partition that may be split, to generate next-level parent partitions or final partitions through splitting. The parent partition is used by a storage system, and the user cannot perceive existence of the parent partition.

A value of L may be set by the user or may be automatically allocated by a system, which is generally determined by both the maximum quantity of IP disks and a fraction of each IP disk when the quantity of IP disks is maximum. That is, L=Maximum quantity of IP disks x Quantity of partitions of each IP disk. It is assumed that it is a preferable value for each IP disks to own X partitions. For example, a user considers that it is a relatively proper value for each IP disk to own 100 partitions, that is, X=100, and a maximum quantity of IP disks that can be supported by an IP disk cluster is 10,000; then, L=10,000×100=1,000,000.

Similarly, the quantity of initial partitions may be set by the user or may be automatically allocated by the system. One optional manner is that: it is assumed that in an initial situation, a quantity M of IP disks is: M=75, and 100 partitions are allocated to each IP disk; then, Total quantity of initial partitions=75×100=7,500. By using the method of the present invention, in an initial phase, a quantity of partitions owned by each IP disk in the storage system may be set freely, where the quantity of partitions may be set to a value that meets a demand of the user and with which the partitions do not occupy excessive resources such as storage resources, calculation resources, and bandwidth resources.

The storage disk detection module 41 is configured to: when detecting that N new storage disks are to join the cluster, acquire the quantity M of current storage disks in the cluster and the total quantity T of currently existing partitions in the cluster, where M, N, and T are all natural numbers.

The partition management apparatus 4 is connected to the IP disk cluster. Therefore, an IP disk newly added to the cluster can be detected by the storage disk detection module 41. Currently, there are already M IP disks, and a total quantity of current partitions is M·P. The N IP disks have been connected to the cluster physically, and can be detected by the storage disk detection module 41, but cannot store data because no partition is allocated to the IP disks.

It should be noted that, "current" refers to a moment at which an operation is to be executed. In this embodiment, an IP disk is not added after the partition management apparatus 4 is initialized. Therefore, the quantity of current IP disks is M. In another embodiment, if the quantity of IP disks in the IP disk cluster changes before this step is executed, a quantity of current IP disks is not M. If a partition has been split before this step is executed, a quantity of initial partitions currently owned by each IP disk is larger than P. T partitions are roughly evenly allocated to M IP disks.

The first-preset-condition determining module 42 is configured to determine whether a mathematical relationship between the total quantity T of current partitions and a total quantity M+N of storage disks meets a first preset condition.

Whether the quantity of current partitions meets a common requirement of the current IP disks and the newly added IP disks is determined. That is, whether the mathematical relationship between the total quantity T of current partitions and the total quantity M+N of storage disks meets the first preset condition is determined, where the determining may be performed in a manner of comparing a formula T/(M+N) and a first threshold. A splitting threshold may be preset by the controller. When this operation is executed for the first time after the controller is initialized, T=M·P. The first threshold may be an integer greater than 10 and less than 20, such as 16, 17, 18, 19, or 20.

One determining method is that: if T/(M+N) is less than the first threshold, the first preset condition is met, and splitting needs to be performed. If a quantity of partitions owned by each IP disk is less than (or may be set to be less than or equal to) a splitting threshold, it indicates that a quantity of partitions owned by each IP disk is excessively small if splitting is not performed; then, at least one of the current partitions needs to be split. If the quantity of partitions owned by each IP disk is not less than the splitting threshold, partition migration needs to be performed.

Another determining method is that: if an average quantity of partitions owned by each IP disk is greater than (or may be set to be greater than or equal to) a threshold after one time of partition splitting, it indicates that a quantity of partitions owned by each IP disk is excessively large if splitting is performed. Then, partition migration needs to be performed. If the average quantity of partitions owned by each IP disk is not greater than the threshold, at least one of the current partitions needs to be split. In addition, the two determining methods may also be combined to perform determining, and a solution with a highest satisfaction degree to a service is selected. All of the following embodiments describe the present invention by using the first determining method as an example.

For the partition splitting module 43, if a conclusion of determining by the first-preset-condition determining module 42 is that the relationship meets the first preset condition, the partition splitting module 43 is configured to: split at least one of the current partitions, so that a total quantity of partitions obtained after the splitting is S; and allocate the partitions obtained after the splitting to the M+N storage disks. A mathematical relationship between the total quantity S of partitions obtained after the splitting and the total quantity M+N of storage disks meets a second preset condition, the total quantity of partitions obtained after the splitting is not greater than a total quantity L of final partitions supported by the cluster, and both L and S are natural numbers greater than 1. The partitions obtained after the splitting may be evenly allocated to the M+N storage disks, or approximately evenly allocated to the M+N storage disks.

The at least one of the current partitions may be split once, or may be split for a plurality of times, until a quantity of partitions obtained after the splitting meets a requirement. That a mathematical relationship between a total quantity S of partitions obtained after the splitting and the total quantity M+N of storage disks meets a second preset condition may be specifically that: $S/(M+N)$ is greater than or equal to a second threshold, where the second threshold is a natural number. The second threshold may be, for example, a natural number greater than 25 and less than 50, such as 47, 48, 49, or 50.

There may be various manners for determining whether the quantity of partitions obtained after the splitting meets a requirement. For example, if the mathematical relationship between the total quantity S of partitions obtained after the splitting and the total quantity M+N of storage disks meets the second preset condition, splitting ends. Specifically, for example, if an average quantity of partitions owned by each IP disk after splitting is greater than or equal to the second threshold, it is considered that the second preset condition is met, and continuity of splitting ends. Alternatively, if an average quantity of partitions owned by each IP disk after splitting meets a preset threshold scope, it is considered that the requirement is met.

If each partition is split into a plurality of sub-partitions in each time of splitting, each partition is split into a same quantity of sub-partitions. From the first time of splitting to an end of splitting, a multiple of a change in partitions is referred to as a splitting coefficient. It is assumed that each parent partition is split into two sub-partitions in each time of splitting. Then, if splitting ends after one time of splitting, a splitting coefficient is 2; if splitting ends after two times of splitting, a splitting coefficient is $2^2$.

If splitting at least one of the current partitions refers to splitting all of the current partitions, a total quantity S of partitions obtained after the splitting=T×Splitting coefficient. If splitting at least one of the current partitions refers to splitting some of the current partitions, a total quantity S of partitions obtained after the splitting<T×Splitting coefficient. A splitting speed in the former splitting manner is higher. In the latter splitting manner, adjustability of the total quantity of partitions obtained after the splitting is better. For specific details, refer to the descriptions of the embodiment of the partition management method. For convenience of description, this embodiment of the present invention is described using the former splitting manner.

The following gives an example of the latter splitting method: it is assumed that the total quantity of final partitions is 1,000, the total quantity of current partitions is 512, and the splitting coefficient is 2; if each partition is split, 1,024 partitions are obtained after splitting, which exceeds the total quantity of final partitions. That the total quantity of current partitions is greater than the total quantity of final partitions is not allowed. To avoid this case, only 488 current partitions may be split: 488+512=1,000, that is, a total quantity of current partitions obtained after splitting just reaches 1,000 and is not greater than a value of the total quantity of final partitions. In addition, if a user considers that 1,000 current partitions are an excessively large quantity, for example, the user considers that it is most proper that the total quantity of current partitions obtained after splitting reaches 800, 288 partitions of the 512 current partitions may be split according to the splitting coefficient 2, so that the total quantity of current partitions obtained after splitting just reaches 800. By using the latter splitting method, it may be that only one partition is split each time; if the splitting coefficient is 2, a difference of total quantities of current partitions before and after splitting is 1; therefore, a granularity for splitting a partition is smallest.

In addition, on the basis of the foregoing embodiment, a splitting coefficient may also be changed. For example, during splitting for the first time, 2 is used as a splitting coefficient, but during splitting for the second time, a splitting coefficient is changed to 5. This can also achieve an objective of rendering a value of the total quantity of partitions obtained after the splitting more adjustable. There is a correspondence between a current partition and a final partition; this correspondence may be stored by the updating module 44, and may be further published by the updating module 44 to a data processing apparatus. Each current partition has an ID, and an ID of a current partition may be an integer greater than or equal to 0. IDs of all current partitions form an arithmetic progression in which a first term is 0 and a common difference is 1. Each final partition has an ID, and an ID of a final partition may be an integer greater than or equal to 0. IDs of all final partitions form an arithmetic progression in which a first term is 0 and a difference is 1. For example, 12 partitions are split into 24 partitions, where IDs of the partitions before splitting are 0, 1, 2, 3, . . . , 9, 10, and 11, and IDs of the partitions after splitting are 0, 1, 2, 3, . . . , 21, 22, and 23.

After a partition is split, a partition ID generation rule may be that: in partitions obtained after the splitting, one partition retains an original ID of the partition, and values of IDs of the other partitions and a value of the original ID of the partition form an arithmetic progression, where terms in the arithmetic progression increase progressively by a common difference of a total quantity M of partitions before splitting. For example, there are 200 partitions in total before splitting, and after splitting, each partition is split into 3 partitions; IDs of three partitions generated after splitting of a partition whose ID is 21 are 221, 421, and 621 in sequence. This ID generation rule may be changed, provided that IDs of current partitions still form a progressively increasing arithmetic progression in which a first term is 0 and a common difference is 1 after an entire splitting process ends.

It should be noted that, when a total quantity T of current partitions is about to reach the total quantity L of final partitions, a case like this may occur: if a total quantity of partitions generated by splitting each partition once is greater than the total quantity L of final partitions, it may be that only some of the partitions are split, or a splitting coefficient is decreased, so that a total quantity of partitions may be increased through splitting, and the total quantity of partitions does not exceed the total quantity L of final partitions.

The updating module 44 is configured to: after the operations of the partition splitting module 43 are executed, update the total quantity of current IP disks that is recorded in the partition management apparatus 4 to M+N, and update the total quantity of current partitions to S. A quantity of current partitions of each IP disk is roughly S/(M+N); therefore, the total quantity S of partitions may not be recorded; instead, it is recorded that the quantity of current partitions of each IP disk in the cluster is roughly S/(M+N).

The operations performed by the updating module 44 are preparation for a next time of splitting; therefore, for this partition management operation, the updating module 44 is not a mandatory module.

Optionally, the partition splitting module 43 or the updating module 44 may further execute an operation of updating a partition view, where the partition view records an IP disk corresponding to a current partition, for example, a correspondence between a partition ID of a current partition and a corresponding IP disk address of an IP disk. That is, the partition view records to which IP disk in the M+N IP disks each partition in the S current partitions is corresponding. The following data processing apparatus may use an updated partition view.

Optionally, a partition migration module (which is not shown in the figure) may be further included. If partition splitting is not performed, the partition migration module may be used to perform partition migration, to migrate some partitions owned by the M original IP disks to the newly added N IP disks, so that M·P partitions are evenly distributed on the M+N IP disks.

Figure 5:
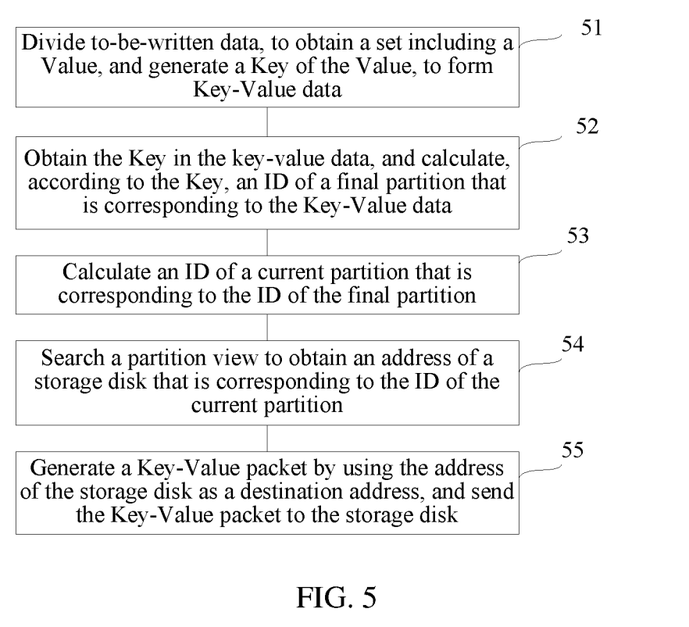
FIG. 5 is a flowchart of an embodiment of a data processing method according to the present invention.

Referring to FIG. 5, the present invention further provides a data processing method, which is applied to a partition management device. The partition management device stores a partition view, and the partition view records a correspondence between an ID of a current partition and an address of a storage disk (for example, an IP disk). The data processing method is executed after a partition management method, and is based on the partition management method. However, the two methods are relatively independent. The partition management device is connected to a controller. The partition management device is, for example, a management server or a switch cluster. The following is described by using the management server as example. An embodiment of the data processing method may be executed based on the partition view provided in the partition management method described above. The partition view is generated by the controller, and is sent to partition management devices in a partition management device cluster for storage.

Step 51: Generate key-value data according to to-be-written data. For example, the to-be-written data is divided, to obtain a set including a value, and a key of the value is generated, one key and one value forms one key-value data, where a key-value is a combination of a key and a value corresponding to the key. Because one piece of to-be-written data may be split into a plurality of values, and correspondingly, a plurality of key-values may be generated. For ease of description, the following steps only describe a processing process of a specific key-value.

The to-be-written data, for example, a file or a data stream, is from an application server. If a size of the to-be-written data is relatively large, for ease of storage, the management server may split the data. For example, the management server may split the data into data segments of an equal size of 1 MB each, and each segment is referred to as a value. A key is used to uniquely identify a value. Therefore, keys of different values are different. For example, "data file name+numeral" may be used as a key of a value. Data with a relatively small size does not need to be split, and a key of the data is directly generated; then, key-value data is formed. In some special scenarios, data with a large size does not need to be split, and corresponding key-value data is directly formed, and is then sent to an IP disk for storage.

Step 52: Obtain a key in the key-value data, and calculate, according to the key, an ID of a final partition that is corresponding to the key-value data. As described above, the key-value data includes a value and the key uniquely corresponding to the value.

A method for calculating the ID of the final partition is: performing a hash operation on the key to obtain a hash value of the key, and performing a modulo operation on the hash value according to the total quantity L of final partitions, where a remainder is used as the ID of the final partition, and L is a natural number greater than or equal to 2. In this way, the obtained ID of the final partition is a digital number. In another embodiment, an equivalent transformation is to map the digital number to another sign, for example, to a number in English, and using the number in English as the ID of the final partition. In addition to the final partition, an initial partition and a current partition may also be represented by using numbers in English. When a final partition corresponding to a key is calculated, or when a correspondence between a current partition and a final partition is calculated, the number in English may be remapped to the digital number, and the digital number obtained through mapping is counted like a partition ID in digital form by using a "modulo" method. In this algorithm, for a concept of the final partition, refer to the descriptions in the foregoing embodiment of the partition management method.

Step 53: Calculate an ID of a current partition that is corresponding to the ID of the final partition, where an ID of each current partition is corresponding to IDs of a plurality of final partitions.

An algorithm of calculating the current partition ID of the final partition ID is: performing a modulo operation on the ID of the final partition according to a total quantity T of current partitions, where a remainder is used as the ID of the current partition, and the total quantity T of current partitions is a natural number. Similarly, the ID of the current partition is a digital number, and an equivalent transformation is to map the digital number to another sign, as the ID of the current partition. The current partition refers to a partition owned by an IP disk cluster at a current moment, and each current partition is corresponding to one IP disk. Reference may be made to the descriptions of the current partition in the foregoing embodiment of the partition management method. The final partition is a sub-partition of the current partition.

In view of this, there is a correspondence between an ID of a current partition and IDs of a plurality of final partitions. For details about the correspondence, refer to the embodiment of the partition management method. There is a correspondence between a current partition and a final partition; this correspondence may be stored in a controller, and is read when step 53 is executed; or the correspondence may not be prestored, and is obtained through calculation according to an algorithm when step 53 is executed. Each current partition has an ID, and an ID of a current partition may be an integer greater than or equal to 0. A set of the IDs of all the current partitions forms an arithmetic progression in which a first term is 0 and a common difference is 1. Each final partition has an ID, and an ID of a final partition may be an integer greater than or equal to 0. A set of the IDs of all the final partitions forms an arithmetic progression in which a first term is 0 and a difference is 1. A method for obtaining a final partition corresponding to a current partition is: performing a modulo operation on the total quantity of current partitions by using an ID of a final partition, where a value of a remainder is used as an ID of the current partition corresponding to the final partition.

In addition, after a partition is split, an ID generation rule may be that: in partitions obtained after the splitting, one partition retains an original ID of the partition, and values of IDs of the other partitions and a value of the original ID of the partition form an arithmetic progression, where terms in the progression increase progressively by a common difference of a total quantity of partitions before splitting. For example, there are 200 partitions in total before splitting, and after splitting, each partition is split into 3 partitions; IDs of three partitions generated after splitting of a partition whose ID is 21 are 221, 421, and 621 in sequence. This ID generation rule may be changed, provided that IDs of current partitions still form a progressively increasing arithmetic progression in which a first term is 0 and a common difference is 1 after an entire splitting process ends. For example, a partition whose ID is 0 is split according to another partitioning method. IDs of three partitions obtained after the splitting may further be 0, 201, and 202; IDs of partitions obtained by splitting a partition whose ID is 1 are 1, 203, and 204; IDs of partitions obtained by splitting a partition whose ID is 3 are 3, 205, and 206; IDs of other partitions can be obtained by analogy.

Step 54: Search the partition view, to obtain an address of a storage disk that is corresponding to the ID of the current partition.

The partition management device stores a partition view, and the partition view records a correspondence between an ID of a current partition and an address of a storage disk. If the storage disk is an IP disk, the address of the storage disk may be an IP address. If the storage disk is based on a protocol of another type, for example, the ATM or IPX protocol, the address of the storage disk is an ATM address or an IPX address.

Step 55: Generate a key-value packet by using the address of the storage disk as a destination address, and send the key-value packet to the storage disk, where a payload of the key-value packet carries the key-value data.

After receiving the key-value packet, the storage disk stores the key-value data.

Figure 6:
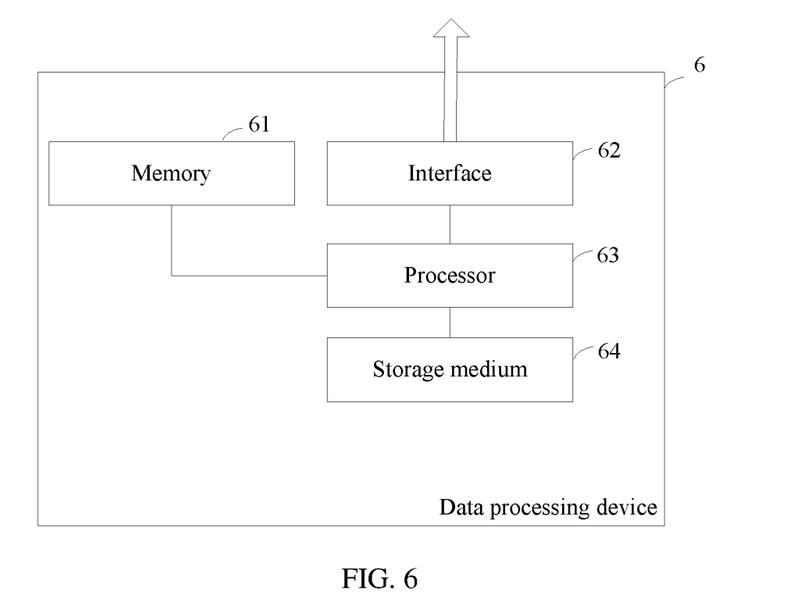
FIG. 6 is a structural diagram of an embodiment of a data processing device according to the present invention.

As shown in FIG. 6, FIG. 6 is an embodiment of a data processing device according to the present invention. The data processing device includes a memory 61, configured to store a partition view, where the partition view records a correspondence between an ID of a current partition and an address of a storage disk. The data processing device also includes an interface 62, configured to provide an external interface. The data processing device also includes a computer-readable medium 63, configured to store a computer program. The data processing device also includes a processor 64, connected to the memory 61, the interface 62, and the computer-readable medium 63 and configured to execute the foregoing data processing method by running the program. The data processing method, for example, includes the following steps: obtaining a key in key-value data, and calculating, according to the key, an ID of a final partition that is corresponding to the key-value data, where the key-value data includes a value and the key uniquely corresponding to the value; calculating an ID of a current partition that is corresponding to the ID of the final partition, where an ID of each current partition is corresponding to IDs of a plurality of final partitions; searching the partition view to obtain an address of a storage disk that is corresponding to the ID of the current partition; and generating a key-value packet by using the address of the storage disk as a destination address, and sending the key-value packet to the storage disk, where the key-value packet carries the key-value data.

Figure 7:
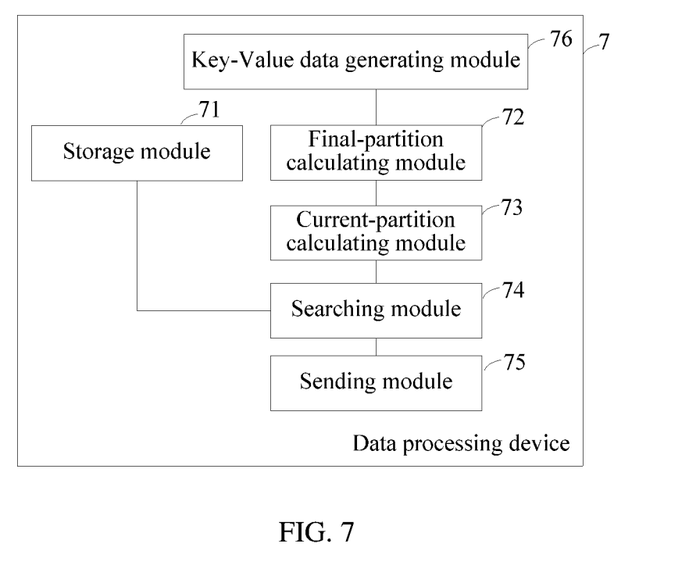
FIG. 7 is a schematic diagram of an embodiment of a data processing apparatus according to the present invention.

As shown in FIG. 7, FIG. 7 is an accompanying drawing of a data processing apparatus 7 according to an embodiment of the present invention. The data processing apparatus 7 includes a storage module 71, a final-partition calculating module 72, a current-partition calculating module 73, a searching module 74, and a sending module 75. Optionally, the data processing apparatus 7 may further include a key-value data generating module 76.

The storage module 71 is configured to store a partition view, where the partition view records a correspondence between an ID of a current partition and an address of a storage disk. A storage medium used by the storage module 71 may be a flash memory or a hard disk.

The partition view of the storage module 71 is from a partition management apparatus, for example, the partition management apparatus 4 in FIG. 4. The storage module 71 may be connected to the partition management apparatus 4, to receive the partition view.

The final-partition calculating module 72 is configured to: obtain a key in key-value data; and calculate, according to the key, an ID of a final partition that is corresponding to the key-value data, where the key-value data includes a value and the key uniquely corresponding to the value.

A method used by the final-partition calculating module 72 to calculate the ID of the final partition is: performing a hash operation on the key to obtain a hash value of the key, and performing a modulo operation on the hash value according to the total quantity L of final partitions, where a remainder is used as the ID of the final partition, and L is a natural number greater than or equal to 2. In this way, the obtained ID of the final partition is a digital number. In another embodiment, an equivalent transformation is to map the digital number to another sign, for example, to a number in English, and using the number in English as the ID of the final partition. In addition to the final partition, an initial partition and a current partition may also be represented by using numbers in English. When a final partition corresponding to a key is calculated, or when a correspondence between a current partition and a final partition is calculated, the number in English may be remapped to the digital number, and the digital number obtained through mapping is counted, like a partition ID in digital form by using a "modulo" method. For a concept of the final partition, refer to the descriptions in the foregoing embodiment of the partition management method.

The current-partition calculating module 73 is configured to calculate an ID of a current partition that is corresponding to the ID of the final partition, where an ID of each current partition is corresponding to IDs of a plurality of final partitions.

A method used by the current-partition calculating module 73 to calculate the ID of the current partition that is corresponding to the ID of the final partition is: performing a modulo operation on the ID of the final partition according to a total quantity T of current partitions, where a remainder is used as the ID of the current partition, and the total quantity T of current partitions is a natural number. Similarly, the ID of the current partition is a digital number, and an equivalent transformation is to map the digital number to another sign, as the ID of the current partition. The current partition refers to a partition owned by an IP disk cluster at a current moment, and each current partition is corresponding to one IP disk. Reference may be made to the descriptions of the current partition in the foregoing embodiment of the partition management method. The final partition is a sub-partition of the current partition.

In view of this, there is a correspondence between an ID of a current partition and IDs of a plurality of final partitions. For details about the correspondence, refer to the embodiment of the partition management apparatus. After generating the correspondence, the partition management apparatus publishes the correspondence to each data processing apparatus. There is a correspondence between a current partition and a final partition; this correspondence may be stored in the current-partition calculating module 73, or the correspondence may not be prestored and may be obtained through calculation by the current-partition calculating module 73. Each current partition has an ID, and an ID of a current partition may be an integer greater than or equal to 0. A set of the IDs of all the current partitions may form a progressively increasing arithmetic progression in which a first term is 0 and a common difference is 1. Each final partition has an ID, and an ID of a final partition may be an integer greater than or equal to 0. A set of IDs of all final partitions forms a progressively increasing arithmetic progression in which a first term is 0 and a difference is 1. For example, 12 partitions are split into 24 partitions, where IDs of the partitions before splitting are 0, 1, 2, 3, . . . , 9, 10, and 11, and IDs of the partitions after splitting are 0, 1, 2, 3, . . . , 21, 22, and 23.

In addition, after a partition is split, an ID generation rule may be that: in partitions obtained after the splitting, one partition retains an original ID of the partition, and values of IDs of the other partitions and a value of the original ID of the partition form an arithmetic progression, where terms in the progression increase progressively by a common difference of a total quantity of partitions before splitting. For example, there are 200 partitions in total before splitting, and after splitting, each partition is split into 3 partitions; IDs of three partitions generated after splitting of a partition whose ID is 21 are 221, 421, and 621 in sequence. This ID generation rule may be changed, provided that IDs of current partitions still form a progressively increasing arithmetic progression in which a first term is 0 and a common difference is 1 after an entire splitting process ends. For example, a partition whose ID is 0 is split according to another partitioning method. IDs of three partitions obtained after the splitting may further be 0, 201, and 202; IDs of partitions obtained by splitting a partition whose ID is 1 are 1, 203, and 204; IDs of partitions obtained by splitting a partition whose ID is 3 are 3, 205, and 206; IDs of other partitions can be obtained by analogy.

The searching module 74 is configured to search the partition view stored by the storage module 71, to obtain an address of a storage disk that is corresponding to the ID of the current partition.

The partition view records a correspondence between an ID of a current partition and an address of a storage disk. If the storage disk is an IP disk, the address of the storage disk may be an IP address. If the storage disk is based on a protocol of another type, for example, the ATM or IPX protocol, the address of the storage disk is an ATM address or an IPX address.

The sending module 75 is configured to: generate a key-value packet by using the address of the storage disk as a destination address; and send the key-value packet to the storage disk, where the key-value packet carries the key-value data.

Next, as a destination device of the key-value packet, the storage disk is configured to receive the key-value packet by using a switch cluster, and then store the key-value data.

The key-value data generating module 76 is configured to generate the key-value data, for example, divide to-be-written data, to obtain a set including a value, and generate the key of the value, to form the key-value data, where a key-value is a combination of a key and a value corresponding to the key. Because one piece of to-be-written data may be split into a plurality of values, and correspondingly, a plurality of key-values may be generated. For ease of description, this embodiment of the present invention only describes a processing manner of a specific key-value.

The to-be-written data, for example, a file or a data stream, is from an application server. If a size of the to-be-written data is relatively large, for ease of storage, the management server may split the data. For example, the management server may split the data into data segments of an equal size of 1 MB each, and each segment is referred to as a value. A key is used to uniquely identify a value. Therefore, keys of different values are different. For example, "data file name+numeral" may be used as a key of a value. Data with a relatively small size does not need to be split, and the data is directly used as a value, to generate key-value data. In some special scenarios, data with a large size does not need to be split, and is directly used as a value, to generate key-value data.

If the data processing device 7 includes the key-value data generating module 76, the final-partition calculating module 72 may be connected to the key-value data generating module 76; if the data processing device 7 does not include the key-value data generating module 76, the final-partition calculating module 72 may directly obtain the key-value data from the application server through an external interface.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

What is claimed is:

1. A method, comprising:

managing, by a partition management controller, a plurality of current partitions for a first plurality of storage disks in a cluster of storage disks;

determining, by the partition management controller, that an additional one or more storage disks have been added to the cluster of storage disks;

when the addition of the one or more storage disks causes an average quantity of current partitions per storage disk of the cluster of storage disks to meet a first condition, and causes the average quantity of current partitions per storage disk of the cluster of storage disks to not meet a second condition, splitting, by the partition management controller, at least one of the current partitions to obtain at least one additional partition, which results in a new total quantity of current partitions; and allocating, by the partition management controller, the at least one additional partition to a second plurality of storage disks in the cluster of storage disks.

2. The method according to claim 1, wherein:

each partition of the plurality of current partitions after splitting corresponds to at least one final partition.

3. The method according to claim 2, wherein after allocating the at least one additional partition, the method further comprises:

receiving a first visiting to the final partition; and transforming the first visiting to a second visiting to a current partition, the current partition corresponding to the final partition of the first visiting.

4. The method according to claim 1, wherein:

the first condition is a first value; and the second condition is a second value.

5. The method according to claim 1, wherein:

the new total quantity of current partitions for the first plurality of storage disks in the cluster of storage disks after the splitting is no more than a preset quantity of final partitions.

6. The method according to claim 1, wherein:

IDs of the plurality of current partitions for the first plurality of storage disks in the cluster of storage disks after the splitting are continuous natural numbers.

7. A device, comprising:

a processor; and a computer-readable storage medium storing a program to be executed by the processor, the program including instructions for:

managing a plurality of current partitions for a first plurality of storage disks in a cluster of storage disks;

determining that an additional one or more storage disks have been added to the cluster of storage disks;

when the addition of the one or more storage disks causes an average quantity of current partitions per storage disk of the cluster of storage disks to meet a first condition, and causes the average quantity of current partitions per storage disk of the cluster of storage disks to not meet a second condition, splitting at least one of the current partitions to obtain at least one additional partition, which results in a new total quantity of current partitions; and allocating the at least one additional partition to a second plurality of storage disks in the cluster of storage disks.

8. The device according to claim 7, wherein:

each partition of the plurality of current partitions after splitting corresponds to at least one final partition.

9. The device according to claim 8, wherein the program further includes instructions for:

receiving a first visiting to the final partition; and transforming the first visiting to a second visiting to a current partition, the current partition corresponding to the final partition of the first visiting.

10. The device according to claim 7, wherein:

the first condition is a first value; and the second condition is a second value.

11. The device according to claim 7, wherein:

the new total quantity of current partitions for the first plurality of storage disks in the cluster of storage disks after splitting is no more than a preset quantity of final partitions.

12. The device according to claim 7, wherein:

IDs of the plurality of current partitions for the first plurality of storage disks in the cluster of storage disks after the splitting are continuous natural numbers.

13. A non-transitory computer readable medium storing instructions that, when executed by one or more processors, causes a device to:

manage a plurality of current partitions for a first plurality of storage disks in a cluster of storage disks;

determine that an additional one or more storage disks have been added to the cluster of storage disks;

when the addition of the one or more storage disks causes an average quantity of current partitions per storage disk of the cluster of storage disks to meet a first condition, and causes the average quantity of current partitions per storage disk of the cluster of storage disks to not meet a second condition, split at least one of the current partitions to obtain at least one additional partition, which results in a new total quantity of current partitions; and allocate the at least one additional partition to a second plurality of storage disks in the cluster of storage disks.

14. The medium according to claim 13, wherein:

each partition of the plurality of current partitions after the splitting corresponds to at least one final partition.

15. The medium according to claim 14, wherein the instructions, when executed by the one or more processors, further causes the device to:

receive a first visiting to the final partition; and transform the first visiting to a second visiting to a current partition, the current partition corresponding to the final partition of the first visiting.

16. The medium according to claim 13, wherein:

the first condition is a first value; and the second condition is a second value.

17. The medium according to claim 13, wherein:

the new total quantity of current partitions for the first plurality of storage disks in the cluster of storage disks after splitting is no more than a preset quantity of final partitions.

18. The medium according to claim 13, wherein:

IDs of the plurality of current partitions for the first plurality of storage disks in the cluster of storage disks after splitting are continuous natural numbers.

* * * * *